(No Model.) 2 Sheets—Sheet 1.

I. B. WARREN.
WASHING MACHINE.

No. 411,233. Patented Sept. 17, 1889.

WITNESSES:
D. C. Reusch
C. Sedgwick

INVENTOR
I. B. Warren
BY
Munn & Co.
ATTORNEY (No Model.) 2 Sheets—Sheet 2.
I. B. WARREN.
WASHING MACHINE.
No. 411,233. Patented Sept. 17, 1889.
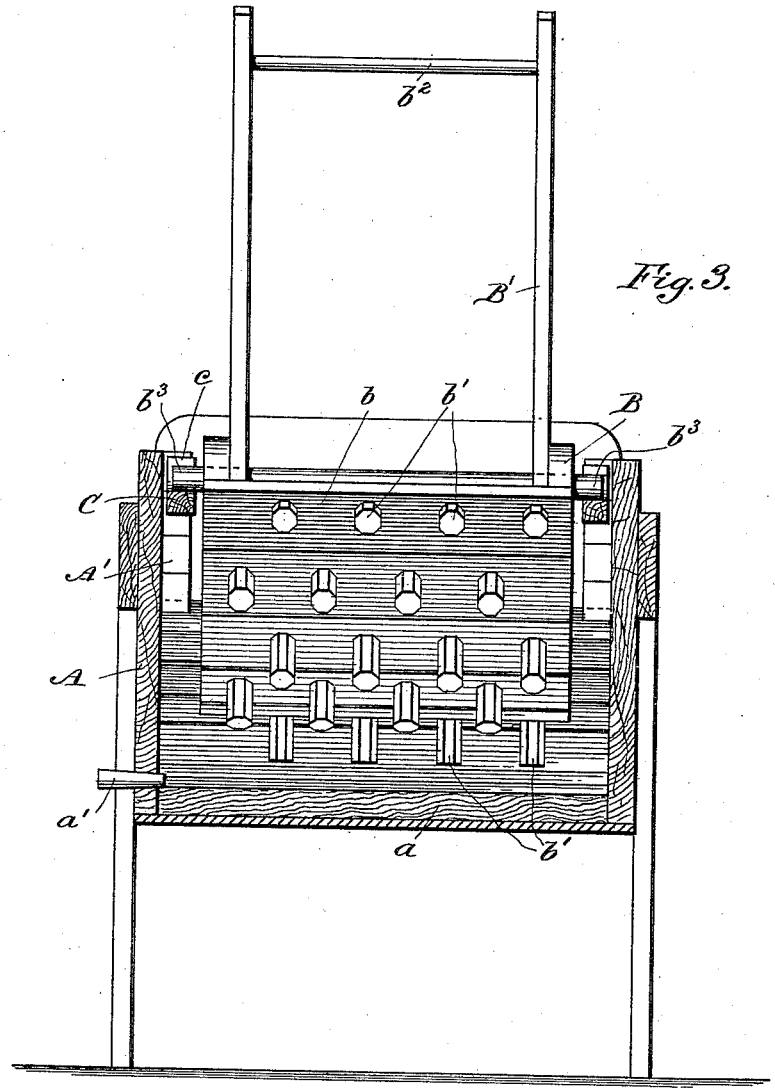
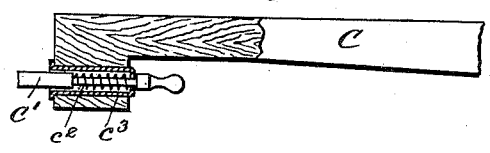
WITNESSES:
D. C. Reusch.
C. Sedgwick.
INVENTOR
I. B. Warren
BY Munn & Co.
ATTORNEY

UNITED STATES PATENT OFFICE.

IRA B. WARREN, OF WAUCOMA, IOWA.

WASHING-MACHINE.

SPECIFICATION forming part of Letters Patent No. 411,233, dated September 17, 1889.

Application filed March 23, 1889. Serial No. 304,467. (No model.)

*To all whom it may concern:*

Be it known that I, IRA B. WARREN, of Waucoma, in the county of Fayette and State of Iowa, have invented a new and Improved Washing-Machine, of which the following is a full, clear, and exact description.

The invention relates to that class of washing-machines in which a curved rubber is arranged for receiving a reciprocating rotary motion in a correspondingly-formed tub or suds-box; and the object of the invention is to provide a machine of this character of cheap and durable construction, having an improved means for effecting a ready adjustment of the rubber relatively to the suds-box.

The invention consists in the novel construction and combination of parts, as hereinafter particularly described, and defined in the claims.

Reference is to be had to the accompanying drawings, forming a part of this specification, in which similar letters of reference indicate corresponding parts in all the figures.

Figure 1:
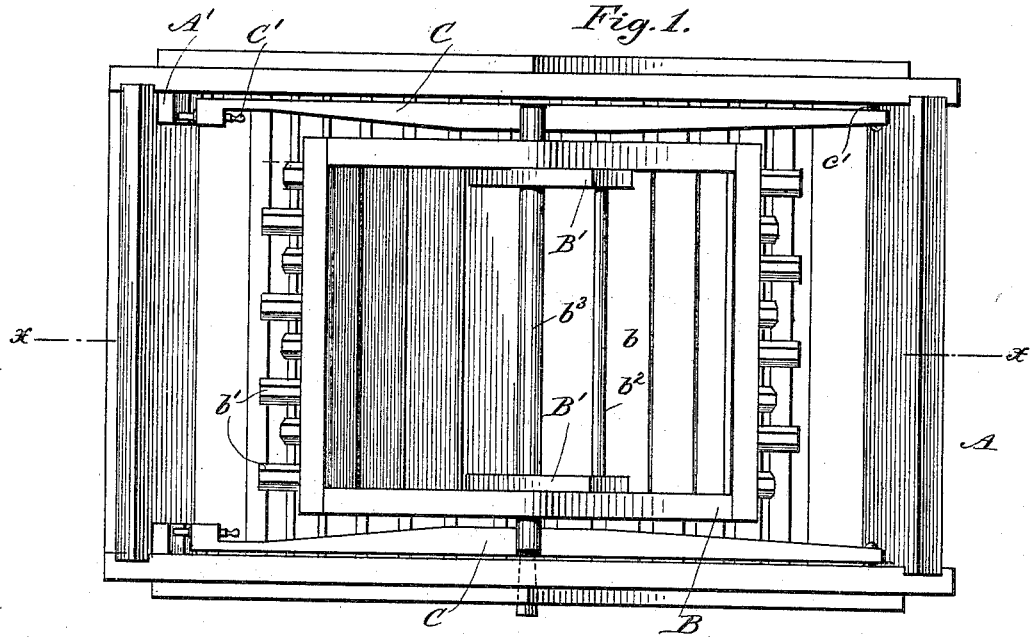
Figure 2:
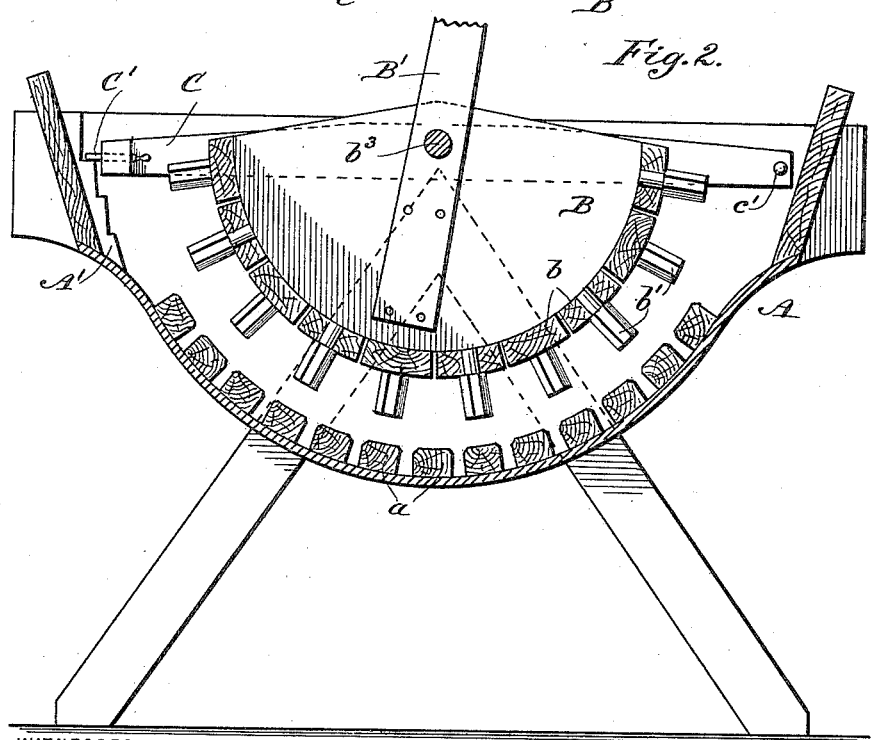

Figure 1 is a plan view of a washing-machine embodying my improvement. Fig. 2 is a central vertical sectional elevation thereof on the line $x\ x$ in Fig. 1, the operating handle or frame of the rubber being partly broken away. Fig. 3 is a transverse vertical sectional elevation, and Fig. 4 is an enlarged sectional detail view of the catch for the bars in which the suds-box is journaled.

On a suitably-constructed frame the tub or suds-box A of the machine is supported, the bottom of which is of zinc or like material, and the inner surface of the said bottom is curved, as shown, and provided with transverse cleats or ribs $a$, against which bottom the clothes are rubbed by the rubber B.

The rubber B is formed with a curved bottom approximating the curved bottom of the suds-box A, the bottom of the rubber being formed of transverse bars $b$, suitably spaced for the circulation of the water therebetween. From the said bars $b$ project a series of pins or studs $b'$, the studs of the several bars being alternately placed or out of alignment with those of the adjoining bars. The rubber is provided with an operating frame or handle consisting of the upright arms $B'$, united at or near the upper end by a rung or cross-bar $b^2$ and carrying at their lower ends the crossbar $b^3$, the outwardly-projecting ends of which form gudgeons that rest in recesses $c$ of the bars C, whereby the rubber is supported by the latter. The bars C extend longitudinally on the inner sides of the suds-box, to which they are pivoted at one end, as at $c'$, and each bar C at its free end is provided with a catch $C'$, that engages the stepped support $A'$, provided on the suds-box A. The catches $C'$, preferably consist each of a spring-bolt, as shown best in Fig. 4, whose spring $c^2$ is inclosed in a casing $c^3$, that is set into the free end of the bar C, the spring acting normally to project the bolt outward to engage the stepped support $A'$. By this construction the rubber may be readily adjusted toward and from the suds-box to accommodate varying quantities of clothes, as desired.

By the arrangement of pins on the rubber, acting in conjunction with the ribbed bottom of the suds-box, the clothes are prevented from rolling while being rubbed, and are maintained in an essentially unfolded condition, whereby only a minimum amount of energy is required to operate the rubber.

The suds-box is provided with a discharge-aperture in its bottom for emptying it of water, the aperture being closed by a plug $a'$, (shown in Fig. 3,) or otherwise.

Having thus described my invention, what I claim as new, and desire to secure by Letters Patent, is—

1. In a washing-machine, the combination, with a suds-box A, of the stepped supports $A'$, secured to one end thereof, the supporting-arms C, pivoted at the opposite end, the spring-bolts $C'$, carried at the free end of the supporting-arms, and the rubber B, journaled near the center of the said arms, substantially as shown and described.

2. The combination, in a washing-machine, of a suds-box, arms pivoted at one end to the inner sides of the suds-box and carrying catches at their free ends that engage supports therefor on the said box, and a rubber journaled in said arms, substantially as described.

IRA B. WARREN.

Witnesses:
FRED FALLOWS,
DANIEL FALLOWS.